US012615435B2

(12) United States Patent
Cai et al.

(10) Patent No.:    US 12,615,435 B2
(45) Date of Patent:        Apr. 28, 2026

(54) RECORDING METHOD AND DEVICE BY USING LOW-POWER-CONSUMPTION RECORDING SYSTEM

(71) Applicant: 70mai Co., Ltd., Shanghai (CN)

(72) Inventors: Risheng Cai, Shanghai (CN); Sheng Yang, Shanghai (CN); Kai Yu, Shanghai (CN); Da Liu, Shanghai (CN); Xiaoxun Tang, Shanghai (CN); Yajie Tang, Shanghai (CN)

(73) Assignee: 70MAI CO., LTD., Shanghai (CN)

( * ) Notice: Subject to any disclaimer, the term of this patent is extended or adjusted under 35 U.S.C. 154(b) by 47 days.

(21) Appl. No.: 18/749,684

(22) Filed: Jun. 21, 2024

(65) Prior Publication Data

US 2025/0350825 A1      Nov. 13, 2025

(30) Foreign Application Priority Data

May 9, 2024    (CN) .......................... 202410573244.2

(51) Int. Cl.
H04N 23/65        (2023.01)
H04N 23/667      (2023.01)
(52) U.S. Cl.
CPC ......... H04N 23/651 (2023.01); H04N 23/667 (2023.01)

(58) Field of Classification Search
None
See application file for complete search history.

(56) References Cited

U.S. PATENT DOCUMENTS

| | | | |
|---|---|---|---|
| 11,843,855 B2* | 12/2023 | Ise ........................ | H04N 23/634 |
| 2010/0299540 A1* | 11/2010 | Brenneman ........... | G06F 1/3225 |
| | | | 710/1 |
| 2012/0033103 A1* | 2/2012 | Corey .................. | H04N 23/667 |
| | | | 348/E5.031 |
| 2016/0309227 A1* | 10/2016 | Casagrande ....... | H04N 21/4583 |

* cited by examiner

*Primary Examiner* — Eileen M Adams
(74) *Attorney, Agent, or Firm* — Bayramoglu Law Offices LLC

(57)        ABSTRACT

A recording method and device uses a low-power-consumption recording system; an operation mode of the low-power-consumption recording system is configured, where the operation mode includes a first-stage operation mode, a second-stage operation mode, and a third-stage operation mode; switching is performed to a current operation mode based on a trigger condition of each operation mode; and power-on/off processing logic of each unit in the low-power-consumption recording system is scheduled based on the current operation mode, to perform video recording. Therefore, energy consumption is optimized, a continuous video monitoring capability is maintained, and a missed recording problem is resolved when a camera with a battery triggers and starts video recording through heat source sensing.

19 Claims, 2 Drawing Sheets

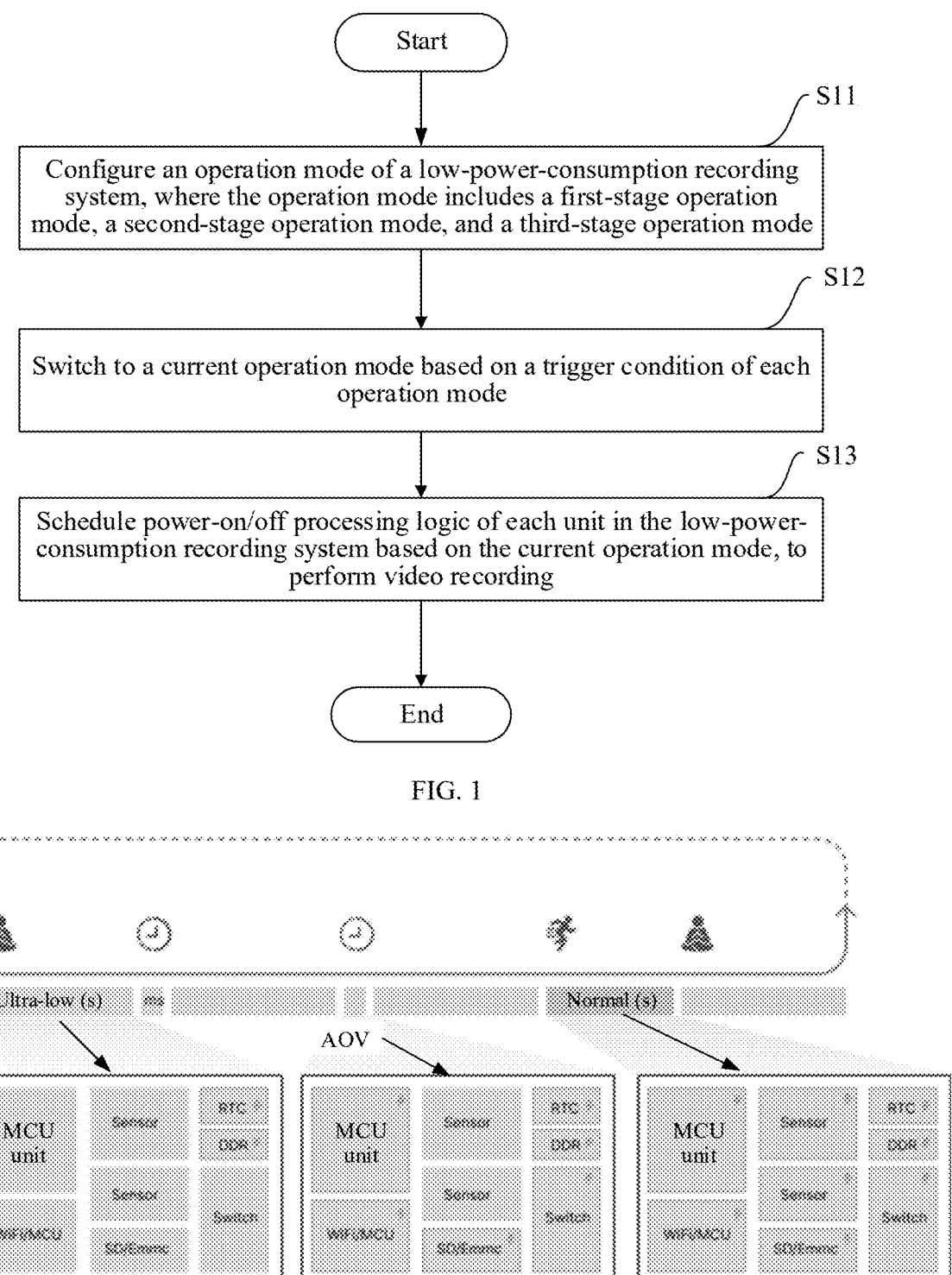

Start

S11

Configure an operation mode of a low-power-consumption recording system, where the operation mode includes a first-stage operation mode, a second-stage operation mode, and a third-stage operation mode

S12

Switch to a current operation mode based on a trigger condition of each operation mode

S13

Schedule power-on/off processing logic of each unit in the low-power-consumption recording system based on the current operation mode, to perform video recording End

FIG. 1

Ultra-low (s)          ···          Normal (s)

AOV

MCU unit          Sensor          RTC          DDR          Sensor          Switch          WIFI&MCU          SD(flerve)

MCU unit          Sensor          RTC          DDR          Sensor          Switch          WIFI&MCU          SD(flerve)

MCU unit          Sensor          RTC          DDR          Sensor          Switch          WIFI&MCU          SD(flerve)

FIG. 2

RECORDING METHOD AND DEVICE BY USING LOW-POWER-CONSUMPTION RECORDING SYSTEM

CROSS REFERENCE TO RELATED APPLICATIONS

This application is based upon and claims foreign priority to Chinese Patent Application No. 202410573244.2, filed on May 9, 2024, the entire contents of which are incorporated herein by reference.

TECHNICAL FIELD

This application relates to the field of recording systems, and in particular, to a recording method and device by using a low-power-consumption recording system.

BACKGROUND

With the growing need for security monitoring, video monitoring systems in continuous operation become increasingly common. Uninterrupted video recording is usually required for these systems to ensure that no potential security incidents are missed. However, this continuous video monitoring poses several significant problems:

The first problem is high power consumption. Continuous video recording requires a camera to be in continuous operation, which leads to high power consumption, especially in a camera powered by a battery. Frequent replacement or recharging of batteries increases use costs and causes inconvenience.

The second problem is data storage and management. Undifferentiated continuous recording generates a large volume of video data. This not only requires high-capacity storage space, but also increases difficulty of data management and retrieval, especially when it is necessary to find a specific event video.

The third problem is processing power requirements. Processing and analysis of a large volume of continuous video data require high computational power. This further increases energy consumption of a device and requires higher hardware performance.

Various solutions are provided in the related art to resolve the foregoing problems, including reducing irrelevant recording by using a motion detection technique, reducing storage requirements by using a video compression technique, and resolving the data management problem through cloud storage. However, these solutions still have limitations:

Motion detection technique: Reliance on simple motion detection may miss important events or incorrectly trigger recording, leading to security holes or unnecessary data storage.

Video compression: A data volume can be reduced, but there is still a transmission problem in a low-bandwidth environment, and a compression process also consumes computing resources.

Cloud storage solution: This solution helps process a large volume of data, but reliance on cloud storage increases requirements for data transmission, leads to high network dependency, and may cause security and privacy problems.

SUMMARY

An objective of this application is to provide a recording method and device by using a low-power-consumption recording system, to resolve problems in the related art, such as missed important events or incorrectly triggered recording, a transmission problem in a low-bandwidth environment, and security and privacy problems.

According to an aspect of this application, a recording method by using a low-power-consumption recording system is provided. The method includes:

configuring an operation mode of the low-power-consumption recording system, where the operation mode includes a first-stage operation mode, a second-stage operation mode, and a third-stage operation mode;

switching to a current operation mode based on a trigger condition of each operation mode; and scheduling power-on/off processing logic of each unit in the low-power-consumption recording system based on the current operation mode, to perform video recording.

Optionally, the configuring an operation mode of the low-power-consumption recording system includes:

configuring the first-stage operation mode of the low-power-consumption recording system, to perform timed recording activation in the first-stage operation mode;

configuring the second-stage operation mode of the low-power-consumption recording system, to start a minimized shooting unit by using an alarm in the second-stage operation mode, to implement photo shooting; and configuring the third-stage operation mode of the low-power-consumption recording system, to start all devices, units, and modules in the system in the third-stage operation mode, to perform continuous video recording.

Optionally, the switching to a current operation mode based on a trigger condition of each operation mode includes:

entering, in a case of being in the first-stage operation mode, the second-stage operation mode if an alarm in the system reaches start time;

exiting the first-stage operation mode or the second-stage operation mode and switching to the third-stage operation mode if a passive infrared sensor is triggered; and switching to the first-stage operation mode if a specified shooting function is completed in the third-stage operation mode.

Optionally, the method includes:

determining temporal distribution of a case in which an event around camera deployment is triggered; and dynamically adjusting the start time of the alarm in the system based on the temporal distribution.

Optionally, the determining temporal distribution of a case in which an event around camera deployment is triggered includes:

determining a cycle of a statistical event, and counting, in each cycle, statistical information of an occurrence feature, occurrence frequency, a time point, and an importance degree of the event around camera deployment; and determining the temporal distribution based on the statistical information.

Optionally, the scheduling power-on/off processing logic of each unit in the low-power-consumption recording system based on the current operation mode includes:

scheduling, if the current operation mode is the first-stage operation mode, RTC and DDR in the low-power-consumption recording system to be power-on and another unit to be power-off;

scheduling, if the current operation mode is the second-stage operation mode, RTC, DDR, MCU, an SD storage unit, a control photosensitive device, and a camera in the low-power-consumption recording system to be power-on and another unit to be power-off; or scheduling, if the current operation mode is the third-stage operation mode, all devices, units, and modules in the low-power-consumption recording system to be power-on.

Optionally, the method includes:

customizing user interface content of the low-power-consumption recording system, where the user interface content includes a time interval for recording, a format and resolution for storing a video, and a priority of an event of interest.

According to another aspect of this application, a recording device by using a low-power-consumption recording system is further provided. The device includes:

one or more processors; and a memory storing computer-readable instructions, where when the computer-readable instructions are executed, the one or more processors are enabled to perform operations of the foregoing method.

According to still another aspect of this application, a computer-readable medium is further provided, storing computer-readable instructions, where the computer-readable instructions are executable by a processor to implement the foregoing method.

Compared with the related art, in this application, an operation mode of the low-power-consumption recording system is configured, where the operation mode includes a first-stage operation mode, a second-stage operation mode, and a third-stage operation mode; switching is performed to a current operation mode based on a trigger condition of each operation mode; and power-on/off processing logic of each unit in the low-power-consumption recording system is scheduled based on the current operation mode, to perform video recording. Therefore, energy consumption is optimized, a continuous video monitoring capability is maintained, and a missed recording problem is resolved when a camera with a battery triggers and starts video recording through heat source sensing.

BRIEF DESCRIPTION OF THE DRAWINGS

Other features, objectives, and advantages of this application become more apparent by reading detailed descriptions of non-limiting embodiments with reference to the following accompanying drawings:

FIG. 1 is a schematic flowchart of a recording method by using a low-power-consumption recording system according to an aspect of this application;

FIG. 2 is a schematic diagram of scheduling of each operation mode according to some embodiments of this application;

Identical or similar reference numerals in the accompanying drawings indicate identical or similar parts.

DETAILED DESCRIPTION OF THE EMBODIMENTS

Figure 3:
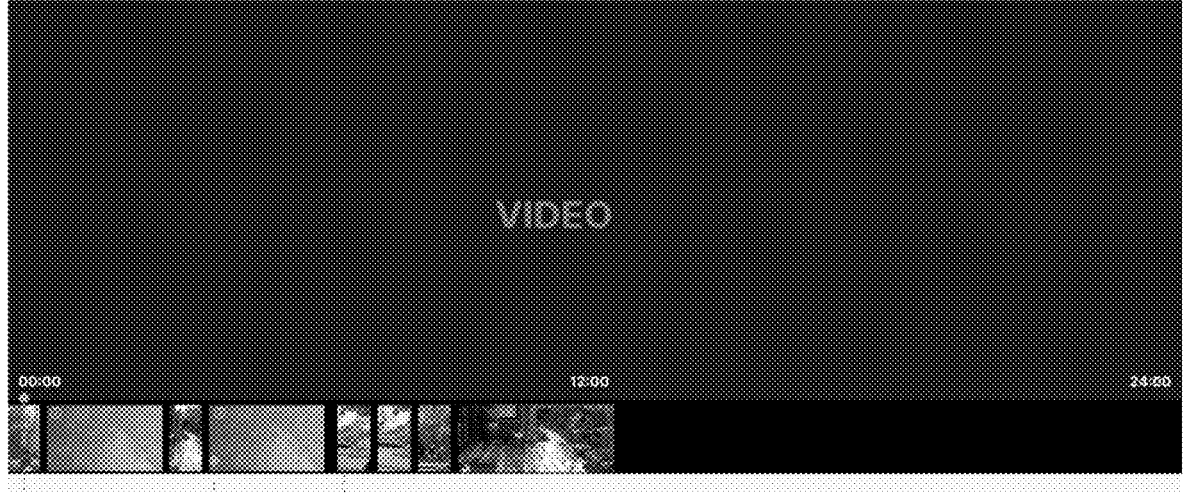
FIG. 3 is a schematic diagram of a presentation manner of an event with a priority according to some embodiments of this application.

The following further describes this application in detail with reference to the accompanying drawings.

In an exemplary configuration of this application, a terminal, a device serving a network, and a trusted party all include one or more processors (for example, central processing units (CPUs)), an input/output interface, a network interface, and an internal memory.

The internal memory may include a volatile memory in a computer-readable medium, a random access memory (RAM), and/or a non-volatile memory, such as a read-only memory (ROM) or a flash RAM. The flash memory is an example of the computer-readable medium.

The computer-readable medium includes permanent and non-permanent, removable and non-removable media that can implement information storage by using any method or technique. The information may be computer-readable instructions, a data structure, a program module, or another data. For example, a computer storage medium includes, but is not limited to, a phase-change RAM (PRAM), a static RAM (SRAM), a dynamic RAM (DRAM), another type of RAM, a ROM, an electrically erasable programmable ROM (EEPROM), a flash memory or another memory technique, a compact disc ROM (CD-ROM), a digital versatile disk (DVD) or another optical storage, a magnetic cartridge tape, magnetic tape/disk storage or another magnetic storage device or any other non-transmission medium, which may be configured to store information that can be accessed by a computing device. As defined herein, the computer-readable medium does not include non-transitory computer-readable media, such as modulated data signals and carriers.

A recording method by using a low-power-consumption recording system provided in this application is based on a new low-power-consumption camera always-on-video (AOV) system. The AOV is a video monitoring system that monitors a specific region in real time by using a camera and a related device, and continuously records a video. According to the method in this application, energy consumption can be optimized, a continuous video monitoring capability can be maintained, a missed recording problem can be resolved when a camera with a battery triggers and starts video recording through heat source sensing, and a power consumption problem that cannot support long-time monitoring due to continuous recording by a camera with a battery at short intervals can be resolved. A specific implementation process is as follows:

FIG. 1 is a schematic flowchart of a recording method by using a low-power-consumption recording system according to an aspect of this application. The method includes step S11 to step S13.

Step S11: Configure an operation mode of the low-power-consumption recording system, where the operation mode includes a first-stage operation mode, a second-stage operation mode, and a third-stage operation mode. The several operation modes of the low-power-consumption recording system are configured for staged shooting and recording, so that video data is recorded differentially and continuously, reducing data capacity. The first-stage operation mode is a low-load operation mode (ultra-low mode), and power consumption is reduced to a very low level in this mode. The second-stage operation mode is an AOV-load operation mode. In this mode, when no event triggers a normal-load operation mode, timed shooting in milliseconds and seconds is implemented by using an alarm in the system. The third-stage operation mode is the normal-load operation mode (normal mode) and implements functions such as normal video shooting or live streaming.

Step S12: Switch to a current operation mode based on a trigger condition of each operation mode. For energy management, a corresponding trigger condition is matched for each operation mode. When one operation mode switches to another operation mode, corresponding energy management is performed. Mode switching is performed based on a trigger condition of each operation mode, and a mode obtained through switching is a current operation mode. For example, if switching is performed from the first-stage operation mode to the second-stage operation mode, the current operation mode is the second-stage operation mode.

Step S13: Schedule power-on/off processing logic of each unit in the low-power-consumption recording system based on the current operation mode, to perform video recording. When the low-power-consumption recording system switches to the current operation mode, powered status of each unit in the system is correspondingly scheduled, that is, a power-on/off state is allocated. The power-on/off state includes a power-on state or a power-off state of a device or a unit. To be specific, some units or modules are powered on for normal use, some units or modules are powered off to not be in a use mode, or all units and modules are powered on for normal use, so that energy consumption is reduced by allocating operation modes. In this case, targeted video recording is performed to obtain differentiated video data, saving storage space.

In some embodiments of this application, in step S11, the first-stage operation mode of the low-power-consumption recording system is configured, to perform timed recording activation in the first-stage operation mode; the second-stage operation mode of the low-power-consumption recording system is configured, to start a minimized shooting unit by using an alarm in the second-stage operation mode, to implement photo shooting; and the third-stage operation mode of the low-power-consumption recording system is configured, to start all devices, units, and modules in the system in the third-stage operation mode, to perform continuous video recording. The first-stage operation mode is a low-load operation mode, and timed shooting activation is implemented in this mode to reduce power consumption to a very low level. The second-stage operation mode is an AOV-load operation mode, and a minimized shooting unit is started by using an alarm in this mode to implement photo shooting. The minimized shooting unit is a minimum quantity of units that can be started for shooting, for example, a minimum quantity of units or modules that can be used to meet only a basic requirement of shooting a photo or shooting a minimized video. For example, six units or modules used in the system are the minimized shooting unit. The third-stage operation mode is a normal-load operation mode, and all devices, units, and modules in the system are started in this mode to implement functions such as video shooting or live streaming.

In some embodiments of this application, in step S12, in a case of being in the first-stage operation mode, the second-stage operation mode is entered if an alarm in the system reaches start time; the first-stage operation mode or the second-stage operation mode is exited and switching is performed to the third-stage operation mode if a passive infrared sensor is triggered; and switching is performed to the first-stage operation mode if a specified shooting function is completed in the third-stage operation mode. In the three operation modes, a power-on/off mechanism of each device or module is dynamically adjusted based on usage status of a device involved in different scenarios, to reduce operation power consumption of a camera. Starting with the first-stage operation mode, that is, first in the ultra-low mode, whether the alarm inside reaches the start time is determined by using an RTC clock. If the start time is reached, the second-stage operation mode (AOV mode) is entered, and some devices, units, or modules are woken up, to implement functions, such as shooting and local storage, of a camera. After the passive infrared (PIR) sensor is triggered, it is determined that an event occurs or a user accesses a camera remotely for live streaming and other behaviors. In this case, the ultra-low mode or the AOV mode is exited, the third-stage operation mode (normal mode) is entered, and all devices, units, and modules are woken up, to complete functions of live video streaming, video recording, and photo shooting. After the functions are completed, some devices, units, or modules are immediately powered off, the normal mode is exited, and the ultra-low mode is entered. A missed recording problem of a camera with a battery is resolved through ultra-low-power-consumption mode allocation, 24-hour shooting in seconds for screen monitoring, and AOV time-lapse shooting.

In some embodiments of this application, in step S13, if the current operation mode is the first-stage operation mode, RTC and DDR in the low-power-consumption recording system are scheduled to be power-on and another unit is scheduled to be power-off;

if the current operation mode is the second-stage operation mode, RTC, DDR, MCU, an SD storage unit, a control photosensitive device, and a camera in the low-power-consumption recording system are scheduled to be power-on and another unit is scheduled to be power-off; or if the current operation mode is the third-stage operation mode, all devices, units, and modules in the low-power-consumption recording system are scheduled to be power-on. As shown in FIG. 2, software and hardware schedule power-on/off processing logic of each unit through switching between different operation modes, reducing power consumption in a standby state, and working time is shorten by using a fast-start technique. In FIG. 2, an up arrow indicates that a corresponding device, unit, or module is powered on. In the low-load operation mode, only RTC and DDR are powered, so that power consumption can be reduced to a very low level while timed shooting activation is implemented. RTC is short for real-time clock and is a real-time clock used in a computer system usually for keeping track of current time and a current date. DDR is short for double data rate and represents a double data rate synchronous dynamic RAM. When the system is in a hibernate mode, the RTC may continue to be in operation to maintain time accuracy, while the DDR memory may enter a low-power-consumption state to save energy. When the system needs to be woken up, the RTC may trigger an interrupt signal to wake up the system, and then the system may recover data from the DDR memory and continue to be in operation. In the AOV-load operation mode, when no event triggers the normal-load operation mode, MCU, an SD memory, a control photosensitive device, and a camera are woken up to be power-on. As shown in FIG. 2, these devices and units with lightning-bolt-shaped marks indicate that these devices and units are all power-on when entering the AOV mode, for timed shooting in milliseconds and seconds by using an alarm in the system. In this case, a camera sensing unit, such as a sensor or PIR, is not in operation. In the normal-load operation mode, all devices, units, and modules in the system are started. As shown in FIG. 2, in the normal mode, all the devices, units, and modules with lightning-bolt-shaped marks indicate that all the devices, units, and modules are power-on when entering the normal mode, to implement functions such as video shooting or live streaming. A main trigger behavior includes occurrence of an event monitored by PIR, a radar, or CMOS, or remote calling of live streaming and other operations by a user. For example, a trigger condition for entering the normal-load operation mode is that the PIR detects an event. Occurrence of an event is detected by using an algorithm, for example, a moving event, a humanoid event, a vehicle, a pet, or the like is detected. The algorithm may be a video detection method based on artificial intelligence, for example, using a deep learning edge computing technique or a video detection and recognition model.

By adjusting power supply time of a device, a working mode can be intelligently adjusted based on a real-time monitoring requirement and energy status, and energy consumption in a continuous monitoring state can be significantly reduced. Especially, it is more important for a camera that relies on a battery for power supply or that works in an energy-constrained environment to extend operation time of a device and reduce maintenance costs and frequency.

In some embodiments of this application, temporal distribution of a case in which an event around camera deployment is triggered is determined; and the start time of the alarm in the system is dynamically adjusted based on the temporal distribution. A timing interval of the alarm is adaptively adjusted through dynamic algorithm recognition, improving endurance. The event around camera deployment includes a humanoid event, a vehicle event, a pet event, and the like that occur in a user monitoring region or a set-up monitoring region. That the temporal distribution of the case in which the event around camera deployment is triggered is determined is to first record the case in which the event around camera deployment is triggered and then determine the triggered temporal distribution. Then, the timing interval, namely, the start time, of the alarm is dynamically adjusted based on the temporal distribution. Whenever the timing interval is reached, the start time is reached to start to enter the AOV operation mode.

Based on the foregoing embodiment, when the temporal distribution is determined, a cycle of a statistical event is determined, and in each cycle, statistical information of an occurrence feature, occurrence frequency, a time point, and an importance degree of the event around camera deployment is counted; and the temporal distribution is determined based on the statistical information. For example, 7 days, 30 days, and 90 days are used as cycles of different statistical events, and the cycles of these statistical events are also adaptive algorithm cycles, that is, adaptive adjustment is performed within these cycles. A time interval is adjusted based on an occurrence feature, occurrence frequency, a time point, and an importance degree of an event in each cycle. After these pieces of information are counted, the corresponding temporal distribution is determined. For example, after a user uses a camera for some cycles, there is no event in the time period 12:00-13:00. In this case, a time interval in this time period is added in a dynamic algorithm, for example, every 20 minutes is added as an interval. AOV time-lapse picture shooting increases event videos, which resolves a problem of monitored event missing.

In some embodiments of this application, the method includes: customizing user interface content of the low-power-consumption recording system, where the user interface content includes a time interval for recording, a format and resolution for storing a video, and a priority of an event of interest. When a user uses a camera, to meet an actual environmental requirement of the user, more customized user interface content is also provided. The user may customize shooting and event recording preferences. For example, the user may adjust an AOV shooting interval based on a home deployment requirement, or may set, based on a requirement, a format and resolution for storing a video, to increase a service life of the camera and storage time of the camera. In addition, for event presentation, the user may set a priority of an event of interest. A presentation manner of a high-priority event on an interface is a direct use and display manner. As shown in FIG. 3, a 24-hour event preview by time makes event type clear, and key information of a high-priority event is directly presented in thumbnails, increasing efficiency of finding an event. The user can customize a working mode of the camera according to an actual application scenario. This not only meets a personalized requirement, but also establishes more visible and easy-to-operate interaction between the user and the system.

In some embodiments of this application, a shooting resolution may be automatically adjusted based on a current environmental condition of the camera, for example, adjusted based on light intensity, to optimize video quality and reduce energy consumption, so that the system can adapt to various working environments more intelligently and flexibly.

In addition, an embodiment of this application further provides a computer-readable medium, storing computer-readable instructions. The computer-readable instructions are executable by a processor to implement the recording method by using the low-power-consumption recording system.

Corresponding to the method above, this application further provides a terminal including modules or units that can perform the steps of the method according to FIG. 1, FIG. 2, or the embodiments. These modules or units may be implemented by hardware, software, or a combination thereof. This is not limited in this application. For example, in an embodiment of this application, a recording device by using a low-power-consumption recording system is further provided. The device includes:

one or more processors; and a memory storing computer-readable instructions, where when the computer-readable instructions are executed, the one or more processors are enabled to perform operations of the foregoing method.

For example, when the computer-readable instructions are executed, the one or more processors are enabled to:

configure an operation mode of the low-power-consumption recording system, where the operation mode includes a first-stage operation mode, a second-stage operation mode, and a third-stage operation mode;

switch to a current operation mode based on a trigger condition of each operation mode; and schedule power-on/off processing logic of each unit in the low-power-consumption recording system based on the current operation mode, to perform video recording.

Figure 4:
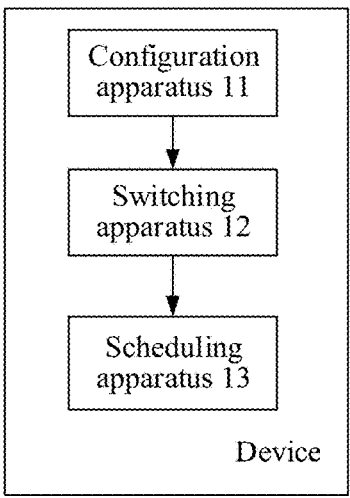
FIG. 4 is a schematic diagram of a structure of a recording device by using a low-power-consumption recording system according to another aspect of this application.

FIG. 4 is a schematic diagram of a structure of a recording device by using a low-power-consumption recording system according to another aspect of this application. The device includes: a configuration apparatus 11, a switching apparatus 12, and a scheduling apparatus 13. The configuration apparatus 11 is configured to configure an operation mode of the low-power-consumption recording system, where the operation mode includes a first-stage operation mode, a second-stage operation mode, and a third-stage operation mode. The switching apparatus 12 is configured to switch to a current operation mode based on a trigger condition of each operation mode. The scheduling apparatus 13 is configured to schedule power-on/off processing logic of each unit in the low-power-consumption recording system based on the current operation mode, to perform video recording.

The configuration apparatus 11 is configured to: configure an operation mode of the low-power-consumption recording system, where the operation mode includes a first-stage operation mode, a second-stage operation mode, and a third-stage operation mode. The several operation modes of the low-power-consumption recording system are configured for staged shooting and recording, so that video data is recorded differentially and continuously, reducing data capacity. The first-stage operation mode is a low-load operation mode (ultra-low mode), and power consumption is reduced to a very low level in this mode. The second-stage operation mode is an AOV-load operation mode. In this mode, when no event triggers a normal-load operation mode, timed shooting in milliseconds and seconds is implemented by using an alarm in the system. The third-stage operation mode is the normal-load operation mode (normal mode) and implements functions such as normal video shooting or live streaming.

The switching apparatus 12 is configured to: switch to a current operation mode based on a trigger condition of each operation mode. For energy management, a corresponding trigger condition is matched for each operation mode. When one operation mode switches to another operation mode, corresponding energy management is performed. Mode switching is performed based on a trigger condition of each operation mode, and a mode obtained through switching is a current operation mode. For example, if switching is performed from the first-stage operation mode to the second-stage operation mode, the current operation mode is the second-stage operation mode.

The scheduling apparatus 13 is configured to: schedule power-on/off processing logic of each unit in the low-power-consumption recording system based on the current operation mode, to perform video recording. When the low-power-consumption recording system switches to the current operation mode, powered status of each unit in the system is correspondingly scheduled, that is, a power-on/off state is allocated. The power-on/off state includes a power-on state or a power-off state of a device or a unit. To be specific, some units or modules are powered on for normal use, some units or modules are powered off to not be in a use mode, or all units and modules are powered on for normal use, so that energy consumption is reduced by allocating operation modes. In this case, targeted video recording is performed to obtain differentiated video data, saving storage space.

Optionally, the configuration apparatus 11 is configured to:

configure the first-stage operation mode of the low-power-consumption recording system, to perform timed recording activation in the first-stage operation mode;

configure the second-stage operation mode of the low-power-consumption recording system, to start a minimized shooting unit by using an alarm in the second-stage operation mode, to implement photo shooting; and configure the third-stage operation mode of the low-power-consumption recording system, to start all devices, units, and modules in the system in the third-stage operation mode, to perform continuous video recording.

Optionally, the switching apparatus 12 is configured to:

enter, in a case of being in the first-stage operation mode, the second-stage operation mode if an alarm in the system reaches start time;

exit the first-stage operation mode or the second-stage operation mode and switch to the third-stage operation mode if a passive infrared sensor is triggered; and switch to the first-stage operation mode if a specified shooting function is completed in the third-stage operation mode.

Optionally, the device includes a determining unit (not shown in FIG. 4) and an adjustment unit (not shown in FIG. 4). The determining unit is configured to determine temporal distribution of a case in which an event around camera deployment is triggered. The adjustment unit is configured to dynamically adjust the start time of the alarm in the system based on the temporal distribution.

Optionally, the determining unit is configured to determine a cycle of a statistical event, and count, in each cycle, statistical information of an occurrence feature, occurrence frequency, a time point, and an importance degree of the event around camera deployment; and determine the temporal distribution based on the statistical information.

Optionally, the scheduling apparatus 13 is configured to:

schedule, if the current operation mode is the first-stage operation mode, RTC and DDR in the low-power-consumption recording system to be power-on and another unit to be power-off;

schedule, if the current operation mode is the second-stage operation mode, RTC, DDR, MCU, an SD storage unit, a control photosensitive device, and a camera in the low-power-consumption recording system to be power-on and another unit to be power-off; or schedule, if the current operation mode is the third-stage operation mode, all devices, units, and modules in the low-power-consumption recording system to be power-on.

Optionally, the device includes a customization apparatus (not shown in FIG. 4). The customization apparatus is configured to customize user interface content of the low-power-consumption recording system, where the user interface content includes a time interval for recording, a format and resolution for storing a video, and a priority of an event of interest.

It is clear that a person skilled in the art may make various modifications and variations to this application without departing from the spirit and scope of this application. In this way, this application is intended to cover these modifications and variations of this application provided that they fall within the scope of the claims of this application and their equivalent technologies.

It needs to be noted that this application may be implemented in software and/or a combination of software and hardware, for example, may be implemented by using an application-specific integrated circuit (ASIC), a general-purpose computer, or any other similar hardware device. In an embodiment, a software program of this application may be executed by a processor to implement the foregoing steps or functions. Similarly, the software program (including a related data structure) of this application may be stored in a computer-readable recording medium, such as a RAM, a magnetic or optical drive, or a floppy disk and a similar device. Alternatively, some of the steps or functions of this application may be implemented by using hardware, for example, a circuit in cooperation with a processor to perform each step or function.

In addition, a part of this application may be applied as a computer program product, for example, computer program instructions. When the computer program instructions are executed by a computer, the method and/or technical solution according to this application may be called or provided through an operation of the computer. Program instructions for calling the method of this application may be stored in a fixed or removable recording medium, and/or transmitted through broadcasting or through a data stream in another signal-bearing medium, and/or stored in a working memory of a computer device running according to the program instructions. According to an embodiment of this application, an apparatus is included. The apparatus includes a memory configured to store computer program instructions and a processor configured to execute the program instructions. When the computer program instructions are executed by the processor, the apparatus is triggered to run the method and/or technical solutions according to the plurality of embodiments of this application.

It is apparent to a person skilled in the art that this application is not limited to details of the foregoing exemplary embodiments, and this application can be implemented in another specific form without departing from the spirit or essential features of this application. Accordingly, the embodiments are to be regarded as exemplary and non-limiting in every point of view, and the scope of this application is limited by the appended claims but not by the foregoing description. Therefore, it is intended that all variations falling within the meaning and scope of equivalent elements of the claims fall within this application. Any reference numerals in the claims should not be regarded as limiting the claims involved. In addition, it is clear that the word "include" does not exclude other units or steps, and that a singular form does not exclude a plural form. A plurality of units or apparatuses in an apparatus claim may alternatively be implemented by one unit or apparatus using software or hardware. The words "first", "second", and the like are used to indicate names but do not indicate any particular order.

What is claimed is:

1. A recording method using a low-power-consumption recording system, comprising:

configuring an operation mode of the low-power-consumption recording system, wherein the operation mode comprises a first-stage operation mode, a second-stage operation mode, and a third-stage operation mode;

switching to a current operation mode based on a trigger condition of each operation mode; and scheduling power-on/off processing logic of hardware units comprising at least one of: a real-time clock, double data rate memory, a microcontroller unit, a storage unit, a control photosensitive device, and a camera in the low-power-consumption recording system based on the current operation mode, to perform video recording, wherein the configuring of the operation mode of the low-power-consumption recording system further comprises:

configuring the first-stage operation mode of the low-power-consumption recording system, to perform timed recording activation in the first-stage operation mode;

configuring the second-stage operation mode of the low-power-consumption recording system, to start a minimized shooting unit by using an alarm in the second-stage operation mode, to implement photo shooting; and configuring the third-stage operation mode of the low-power-consumption recording system, to start all devices, units, and modules in the system in the third-stage operation mode, to perform continuous video recording.

2. The recording method according to claim 1, wherein the switching to the current operation mode based on the trigger condition of each operation mode comprises:

entering, in a case of being in the first-stage operation mode, the second-stage operation mode if an alarm in the system reaches start time;

exiting the first-stage operation mode or the second-stage operation mode and switching to the third-stage operation mode if a passive infrared sensor is triggered; and switching to the first-stage operation mode if a specified shooting function is completed in the third-stage operation mode.

3. The recording method according to claim 2, further comprising:

determining temporal distribution of a case in which an event around camera deployment is triggered; and dynamically adjusting the start time of the alarm in the system based on the temporal distribution.

4. The recording method according to claim 3, wherein the determining of the temporal distribution of the case in which an event around camera deployment is triggered comprises:

determining a cycle of a statistical event, and counting, in each cycle, statistical information of an occurrence feature, occurrence frequency, a time point, and an importance degree of the event around camera deployment; and determining the temporal distribution based on the statistical information.

5. The recording method according to claim 1, wherein the scheduling power- on/off processing logic of each unit in the low-power-consumption recording system based on the current operation mode comprises:

scheduling, if the current operation mode is the first-stage operation mode, RTC and DDR in the low-power-consumption recording system to be power-on and another unit to be power-off;

scheduling, if the current operation mode is the second-stage operation mode, RTC, DDR, MCU, an SD storage unit, a control photosensitive device, and a camera in the low-power-consumption recording system to be power-on and another unit to be power-off; or scheduling, if the current operation mode is the third-stage operation mode, all devices, units, and modules in the low-power-consumption recording system to be power-on.

6. The recording method according to claim 1, further comprising:

customizing user interface content of the low-power-consumption recording system, wherein the user interface content comprises a time interval for recording, a format and resolution for storing a video, and a priority of an event of interest.

7. A recording device using a low-power-consumption recording system, comprising:

one or more processors; and a memory storing computer-readable instructions, wherein when the computer-readable instructions are executed, the one or more processors are enabled to perform operations of the method according to claim 1.

8. The recording device according to claim 7, wherein the one or more processors are further enabled to perform operations of:

configuring the first-stage operation mode of the low-power-consumption recording system, to perform timed recording activation in the first-stage operation mode;

configuring the second-stage operation mode of the low-power-consumption recording system, to start a minimized shooting unit by using an alarm in the second-stage operation mode, to implement photo shooting; and configuring the third-stage operation mode of the low-power-consumption recording system, to start all devices, units, and modules in the system in the third-stage operation mode, to perform continuous video recording.

9. The recording device according to claim 7, wherein the one or more processors are further enabled to perform operations of:

entering, in a case of being in the first-stage operation mode, the second-stage operation mode if an alarm in the system reaches start time;

exiting the first-stage operation mode or the second-stage operation mode and switching to the third-stage operation mode if a passive infrared sensor is triggered; and switching to the first-stage operation mode if a specified shooting function is completed in the third-stage operation mode.

10. The recording device according to claim 9, wherein the one or more processors are further enabled to perform operations of:

determining temporal distribution of a case in which an event around camera deployment is triggered; and dynamically adjusting the start time of the alarm in the system based on the temporal distribution.

11. The recording device according to claim 10, wherein the one or more processors are further enabled to perform operations of:

determining a cycle of a statistical event, and counting, in each cycle, statistical information of an occurrence feature, occurrence frequency, a time point, and an importance degree of the event around camera deployment; and determining the temporal distribution based on the statistical information.

12. The recording device according to claim 7, wherein the one or more processors are further enabled to perform operations of:

scheduling, if the current operation mode is the first-stage operation mode, RTC and DDR in the low-power-consumption recording system to be power-on and another unit to be power-off;

scheduling, if the current operation mode is the second-stage operation mode, RTC, DDR, MCU, an SD storage unit, a control photosensitive device, and a camera in the low-power-consumption recording system to be power-on and another unit to be power-off; or scheduling, if the current operation mode is the third-stage operation mode, all devices, units, and modules in the low-power-consumption recording system to be power-on.

13. The recording device according to claim 7, wherein the one or more processors are further enabled to perform operations of:

customizing user interface content of the low-power-consumption recording system, wherein the user interface content comprises a time interval for recording, a format and resolution for storing a video, and a priority of an event of interest.

14. A non-transitory computer-readable medium, storing computer-readable instructions, wherein the computer-readable instructions are executable by a processor to implement the method according to claim 1.

15. The non-transitory computer-readable medium according to claim 14, wherein the computer-readable instructions are executable by a processor to further implement:

configuring the first-stage operation mode of the low-power-consumption recording system, to perform timed recording activation in the first-stage operation mode;

configuring the second-stage operation mode of the low-power-consumption recording system, to start a minimized shooting unit by using an alarm in the second-stage operation mode, to implement photo shooting; and configuring the third-stage operation mode of the low-power-consumption recording system, to start all devices, units, and modules in the system in the third-stage operation mode, to perform continuous video recording.

16. The non-transitory computer-readable medium according to claim 14, wherein the computer-readable instructions are executable by a processor to further implement:

entering, in a case of being in the first-stage operation mode, the second-stage operation mode if an alarm in the system reaches start time;

exiting the first-stage operation mode or the second-stage operation mode and switching to the third-stage operation mode if a passive infrared sensor is triggered; and switching to the first-stage operation mode if a specified shooting function is completed in the third-stage operation mode.

17. The non-transitory computer-readable medium according to claim 16, wherein the computer-readable instructions are executable by a processor to further implement:

determining temporal distribution of a case in which an event around camera deployment is triggered; and dynamically adjusting the start time of the alarm in the system based on the temporal distribution.

18. The non-transitory computer-readable medium according to claim 17, wherein the computer-readable instructions are executable by a processor to further implement:

determining a cycle of a statistical event, and counting, in each cycle, statistical information of an occurrence feature, occurrence frequency, a time point, and an importance degree of the event around camera deployment; and determining the temporal distribution based on the statistical information.

19. The non-transitory computer-readable medium according to claim 14, wherein the computer-readable instructions are executable by a processor to further implement:

scheduling, if the current operation mode is the first-stage operation mode, RTC and DDR in the low-power-consumption recording system to be power-on and another unit to be power-off;

scheduling, if the current operation mode is the second-stage operation mode, RTC, DDR, MCU, an SD storage unit, a control photosensitive device, and a camera in the low-power-consumption recording system to be power-on and another unit to be power-off; or scheduling, if the current operation mode is the third-stage operation mode, all devices, units, and modules in the low-power-consumption recording system to be power-on.

* * * * *